(12) United States Patent
Brown et al.

(10) Patent No.: US 6,705,720 B2
(45) Date of Patent: Mar. 16, 2004

(54) READING GLASSES

(76) Inventors: Garrett W. Brown, 515 Addison Ct., Philadelphia, PA (US) 19147; Anthony D. Sacksteder, 645 W. Sedgwick St., Philadelphia, PA (US) 19119

( * ) Notice: Subject to any disclaimer, the term of this patent is extended or adjusted under 35 U.S.C. 154(b) by 0 days.

(21) Appl. No.: 10/422,447

(22) Filed: Apr. 24, 2003

(65) Prior Publication Data

US 2003/0202152 A1 Oct. 30, 2003

Related U.S. Application Data

(60) Provisional application No. 60/375,780, filed on Apr. 26, 2002.

(51) Int. Cl.[7] ................................................. G02C 1/00
(52) U.S. Cl. ........................................ 351/41; 351/158
(58) Field of Search ............................ 351/41, 60, 111, 351/156, 158

(56) References Cited

U.S. PATENT DOCUMENTS

| | | | | | |
|---|---|---|---|---|---|
| 4,139,281 A | * | 2/1979 | Luttner | ....................... | 351/111 |
| 4,171,153 A | * | 10/1979 | Melluish | ..................... | 351/158 |
| 6,142,623 A | * | 11/2000 | Jones | ......................... | 351/156 |

* cited by examiner

*Primary Examiner*—Hung Xuan Dang
(74) *Attorney, Agent, or Firm*—Schnader Harrison Segal & Lewis, LLP

(57) ABSTRACT

An optical device in the form of reading glasses is made to be discreet and easily transported. The device comprises a lens; a nosepiece; a weighted counterbalance; and a supporting bar interconnecting said nosepiece between said lens and said counter balance. At least one of the lens, the nosepiece, and the counterbalance is adjustably displaceable about and along said supporting bar for maintaining balance.

10 Claims, 2 Drawing Sheets

READING GLASSES

This application claims the benefit of Provisional application Ser. No. 60/375,780, filed Apr. 26, 2002.

FIELD OF THE INVENTION

The invention relates to eyewear. Particularly, the invention relates to occasional use eyewear. Most specifically, the invention relates to easily stored and carried reading glasses of the monocle or binocular varieties.

DESCRIPTION OF RELATED ART

As people get older, they sometimes require, often for the first time, reading glasses. This can be a difficult emotional and psychological event for some. This is even more evident in the present than in the past, with a generation of baby boomer that are much more active into their later years than in previous generations.

Traditionally, women carried their reading glasses discreetly in their purses, men in their shirt or jacket pocket. Chains were also used to hold the glasses dangling from the wearer's neck for easy access. Today, embracing a more casual, active lifestyle, women are not carrying purses and men are wearing shirts without pockets. An unsightly chain around the neck, prominently displaying the need for reading glasses, is not acceptable in today's youthful society. Pants pockets are not an acceptable alternative since the bulge from the glasses is not fashionably acceptable, comfortable, or even safe. For many people, there simply is no place to carry a pair of reading glasses until they are needed.

Accordingly, small, discreet, easily portable, yet effective, reading glasses are desirable. Almost certainly, men and women, alike, are carrying wallets. Wallets that are small enough to fit in their pants pockets comfortably. Thus, a small, discreet, flat, piece of reading eyewear, which could be carried in a wallet, is highly desirable.

SUMMARY OF THE INVENTION

Figure 1:
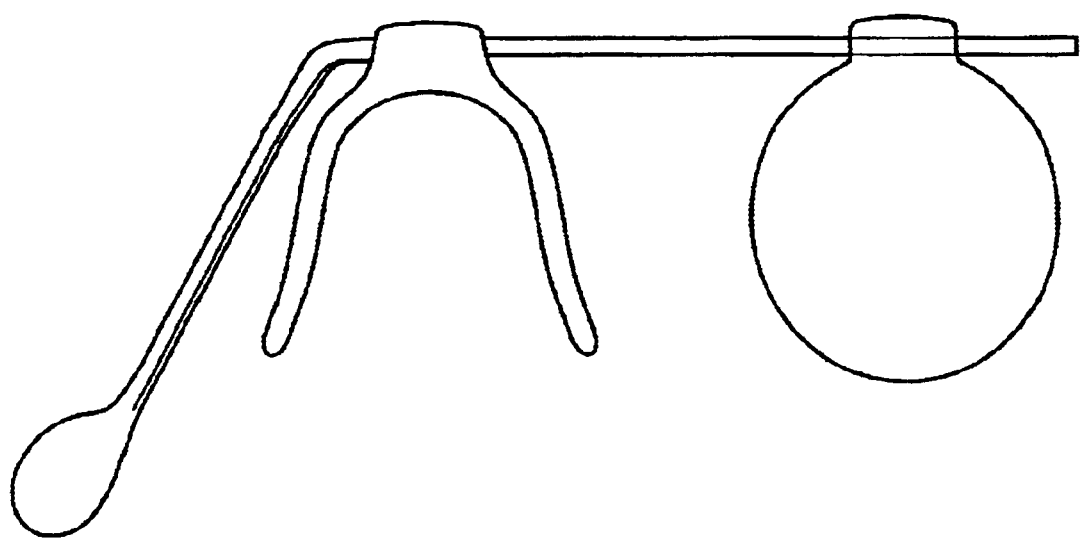
FIG. 1 is a plan view of an optical device in a stored (planar) position.
Figure 2:
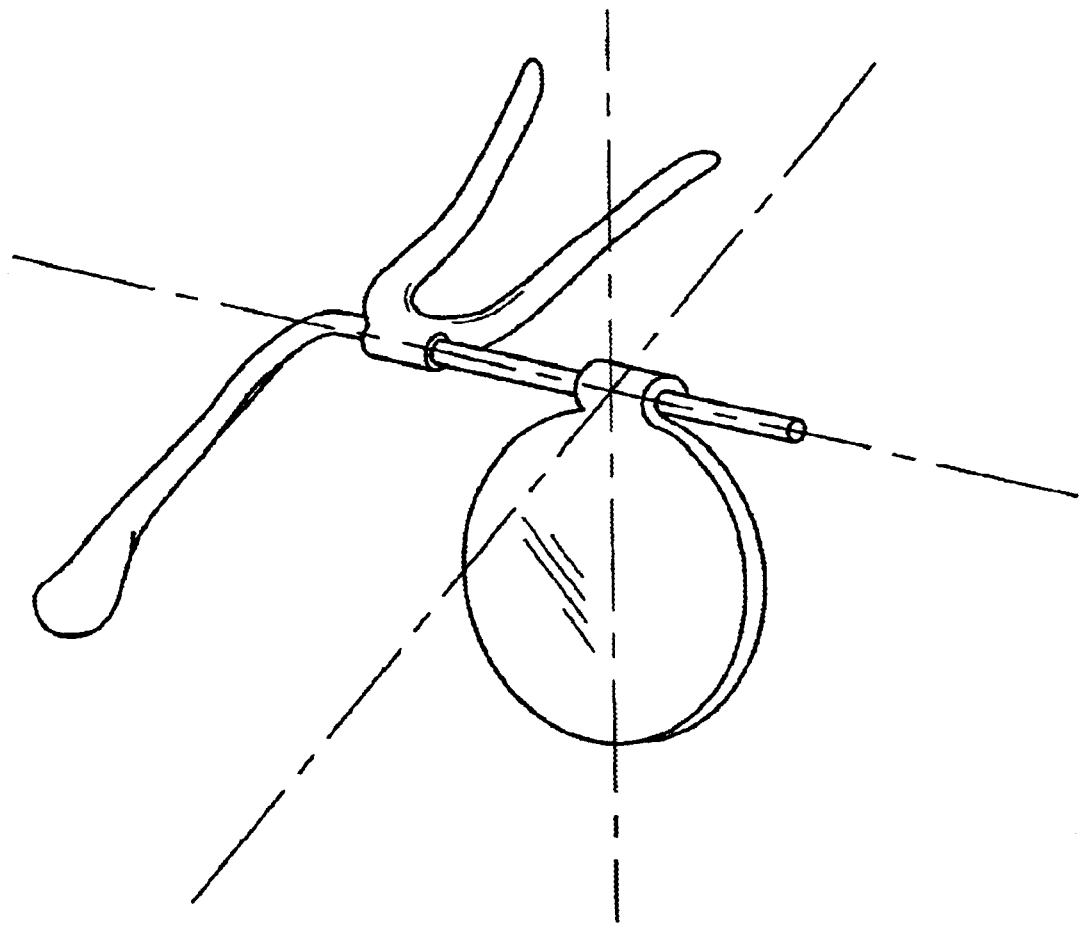
FIG. 2 is a perspective view of an optical device is a wearing position.

An optical device in the form of reading glasses is made to be discreet and easily transported. The device comprises a lens; a nosepiece; a weighted counterbalance; and a supporting bar interconnecting said nosepiece between said lens and said counter balance. At least one of the lens, the nosepiece, and the counterbalance is adjustably displaceable about and along said supporting bar for maintaining balance.

DETAILED DESCRIPTION

The inventive optical device has a lens, a nosepiece, a weighted counterbalance, and a supporting bar. The supporting bar interconnects the nosepiece between the lens and the counterbalance. The entire device is designed to be supported and balanced on the bridge of the wearer's nose. To achieve this affect, at least one of the lens, the nosepiece, and the counterbalance is adjustably displaceable about the supporting bar for maintaining balance.

Preferably, each is independently adjustable with respect to the others. Displaceable about the supporting bar means, for these purposes, that the element is free to rotate about the longitudinal axis, and is displaceable along its length as well. The lengthwise adjustment also allows for accommodation of different spacing between eyes. In a further preferred embodiment, the supporting bar is in two pieces. The counterbalance is, thus, freely adjustable with respect to the lens and vice versa.

The supporting bar is generally a laterally extending, elongated bar for supporting the other elements. Near one end, the lens is mounted. Near the other end, the counterbalance is mounted. Therebetween is the nosepiece. In a preferred embodiment, the supporting bar has at least one flat, planar longitudinal surface, creating a D-shaped cross-section. The flat surface preferably faces the wearer and engages internal springs or other securing devices in the nosepiece, lens or counterbalance. Alternatively, the supporting bar is provided with one or more detents for locking the various components into preferred arrangements. For example, detents are provided at longitudinal lengths corresponding to standard distances between the eye and nose, and along the circumference at least in positions corresponding to wearable positions and storage positions.

The lens itself is preferably made of optical grade acrylic. The acrylic is both lightweight and strong. The size of the lens may vary to accommodate the size of the wearer's eye, but need not be as large as conventional lenses or even their "half-moon" cousins. Instead, because the lens is worn temporarily and immediately in front of the eye, it can be considerably smaller. Diameters of approximately 0.75 inch have been found to be high effective. Of course, the relative strength of the lens can be adjusted during fabrication by known techniques.

The lens is preferably generally circular in shape, having a tab-like extension at an upper edge. The tab-like extension defines a channel through which the supporting bar extends. In a preferred embodiment, this channel is provided with one or more detents corresponding to prearranged preferred displacement positions. These detents may work alone or in combination with mating elements on the supporting bar.

The lens is adjustable laterally along the length of the supporting bar for proper alignment in front of the eye. The lens is also rotatable about the longitudinal axis of the supporting bar to accommodate preferred viewing angles. Once the lens is prosperly positioned, the rest of the system may be balance.

The counter balance is found at an end opposite the lens. Once the lens is positioned for viewing clarity, the counterbalance is positioned to maintain the overall balance and comfort of the eyewear. The counterbalance, as shown in the Figs. is preferably positioned below the position of the lens at the opposite side. As with the lens, the counterbalance is preferably laterally adjustable. Rotational adjustment may not be readily needed, but is certainly a possibility.

In a second embodiment, the counterbalance is actually a second lens. In this embodiment, the eyewear is of the binocular type rather than monocular. In this situation, it should be readily apparent that the lenses are substantially identical, except, possibly, for their respective strengths. When a second lens is used, the lenses will generally be symmetrically displaced from the nosepiece, keeping the entire system in balance. Naturally, the asymmetrical arrangements are possible to maintain balance where the contours of the wearer's face demands.

The nosepiece, as alluded to above, is generally disposed midway between the lens and the counterbalance. This, however, need not always be the case. With heavier counterbalances, shorter distances can be achieved on the counterbalance side of the supporting wire. In fact, it is contemplated that appropriate weighting of the nosepiece, itself, can provide sufficient weight to act as the counterbalance.

Regardless, the nosepiece is generally U-shaped for receiving the bridge of the wearer's nose. A channel is provided in the nosepiece for accepting the supporting bar therethrough. As with the lens, the nosepiece is freely adjustable along and about the supporting bar. Like the lens, the nosepiece is preferably supplied with detents or other means for locking into preferred locations.

In addition to potentially being weighted, the nosepiece is preferably made of resilient or deformable material. The resilient nature of such a nosepiece allows it to have gripping action on the nose, rather than relying solely on the balancing effect of the system.

The elements of the eyewear are generally adjustable between at least two positions. The first position is adapted for storage. When the nosepiece, lens, and counterbalance are rotated such that they are in planar alignment, a very small and slim package results. The folder device is easily stored in a wallet or other small enveloping structure. The other position corresponds to a wearable position that is further adjustable as described above. In the worn position, the nosepiece is approximately at a right angle to the lens, subject of course, to the wearer's adjustment. In this manner, an easily portable, discreet reading lens is readily available to today's active minded people.

What is claimed is:

1. An optical device comprising:

a lens;

a nosepiece;

a weighted counterbalance; and a supporting bar interconnecting said nosepiece between said lens and said counter balance;

wherein at least on of said lens, said nosepiece, and said counterbalance is adjustable displaceable about said supporting bar for maintaining balance.

2. The optical device of claim 1, wherein said nosepiece is selectively rotatable about said supporting bar at least between a stored position in planar alignment with each of said lens and said counterbalance and a user adjustable position where said nosepiece is approximately 90° out of phase with said lens.

3. The optical device of claim 1 wherein said nosepiece is generally made from resilient material for actively engaging the bridge of the wearer's nose.

4. The optical device of claim 1 wherein said nosepiece defines a channel for accepting said support bar for rotation therein, said channel further provided with detents for locking at a desired position.

5. The optical device of claim 1 wherein said lens is selectively rotatable about said supporting bar at least between a stored position in planar alignment with each of said lens and said counter balance and a user adjustable position where said nosepiece is approximately 90° out of phase with said lens.

6. The optical device of claim 1 wherein said counterbalance is mounted on said support bar to be freely and independently adjustable from said lens for maintaining balance.

7. The optical device of claim 1 wherein said counter balance is a second lens substantially identical to said lens.

8. The optical device of claim 7, wherein said second lens is substantially identical to said lens and has a different optical strength.

9. The optical device of claim 1 wherein said supporting bar has one elongated flat planar surface such that said bar has a D-shaped cross-section.

10. The optical device of claim 9 wherein said flat surface is positioned facing the wearer.

* * * * *